United States Patent [19]

Woligrocki

[11] 3,882,786

[45] May 13, 1975

[54] TRANSIT SYSTEM

[76] Inventor: Gordon Woligrocki, 170 Scotia St., Winnipeg, Manitoba, Canada

[22] Filed: May 14, 1973

[21] Appl. No.: 359,766

[52] U.S. Cl. ................................ 104/89; 104/118
[51] Int. Cl. ............................................. B61b 3/00
[58] Field of Search ........... 104/88, 89, 94, 95, 106, 104/107, 118, 120, 123, 124; 105/141, 144, 105/145, 148, 154, 155, 215 R

[56] References Cited
UNITED STATES PATENTS

| | | | |
|---|---|---|---|
| 3,590,743 | 7/1971 | Larson | 104/88 |
| 3,760,737 | 9/1973 | Becker | 104/89 |

Primary Examiner—M. Henson Wood, Jr.
Assistant Examiner—D. W. Keen
Attorney, Agent, or Firm—Stanley G. Ade

[57] ABSTRACT

Combination upper and lower rails are supported in spaced and parallel relationship upon pylons or the like. The individual vehicles are provided with upper and lower wheel bogeys. The vehicle moves in one direction by engagement of the lower wheel bogeys on the upper side of the rails and in the other direction by engagement of the upper wheel bogeys on the under side portion of the rails. This means that vehicles can move in either direction without danger of collision and without the necessity of providing either a double rail or sidings for the passage of vehicles travelling in opposite directions. The vehicles can either be self-propelled or can be moved by a prime mover.

7 Claims, 9 Drawing Figures

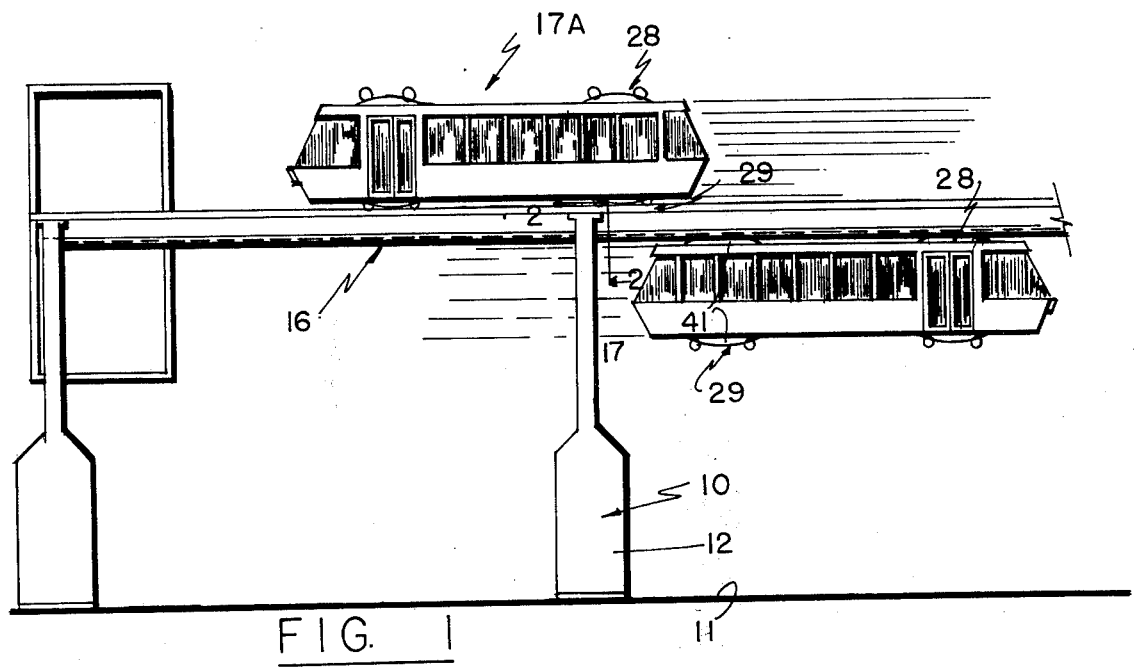
FIG. 1
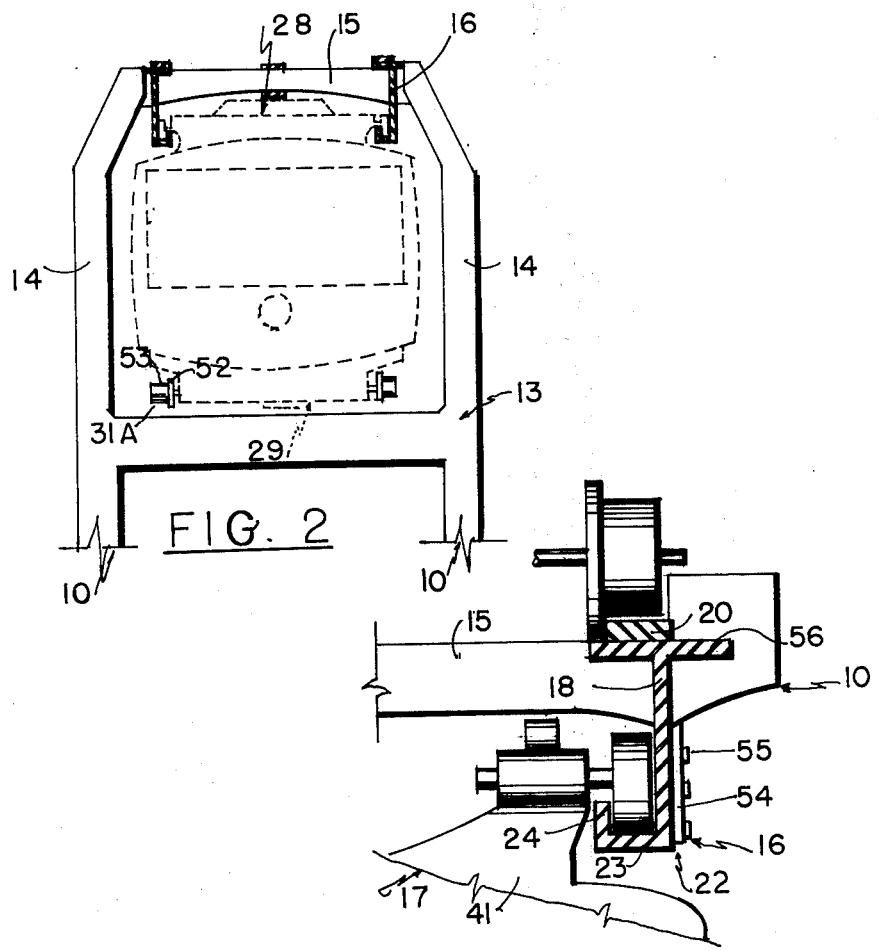
FIG. 2
FIG. 3

3,882,786

TRANSIT SYSTEM

BACKGROUND OF THE INVENTION

This invention relates to new and useful improvements in transit systems for the movement of either goods, mail or passengers or a combination thereof.

It is designed primarily for an overhead rail system and although such systems have been designed in the past, nevertheless they suffer from several disadvantages.

As an example, the majority of systems known utilizing overhead rails, are provided with vehicles having wheeled bogeys on the underside thereof which travel upon the rails. This means that if vehicles are travelling in both directions, either double rail systems are required or a series of by-pass sidings are required so that the vehicles or trains can pass one another safely.

The same objections are present in well-known monorail systems whether the vehicle is situated upon the upper surface of the rail or whether it is hung therefrom.

SUMMARY OF THE INVENTION

The present invention overcomes these disadvantages by providing an overhead rail system which includes a pair of spaced and parallel rails supported upon pylons or the like and having means whereby the vehicles can run in one direction upon the upper portion of the rails and can run in the other direction by hanging from the rails through wheel bogeys upon the upper surface of the vehicles. This means that a single rail system carried on a single row of pylons can accommodate vehicles travelling in either direction without the necessity of sidings being provided and without any danger of collision occurring from vehicles travelling in opposite directions.

The principal object and essence of the invention is therefore to provide a system of the character herewithin described which enables trains or vehicles to move in one direction upon the rails and in the other direction hung from the same rails.

A still further object of the invention is to provide a system of the character herewithin described which can be mounted on single pylons or double pylons as described whereby vehicles or trains can move in either direction upon a common rail thus cutting down considerably the amount of land required to accommodate such overhead rail or transit systems.

A still further object of the invention is to provide a system of the character herewithin described which is adapted for use with prime movers, pulling a plurality of vehicles or carriages or which can be used with self-propelled individual vehicles or carriages as desired.

A yet further object of the invention is to provide a system of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings.

DESCRIPTION OF THE DRAWINGS

FIG. 1 is a side elevation of a portion of the rail system showing two vehicles one upon the rail and the other suspended therefrom.

FIG. 2 is an enlarged end elevation taken substantially along the line 2—2 of FIG. 1.

FIG. 3 is an enlarged fragmentary cross sectional view showing the engagement of one of the wheels with the upper side of the track and the engagement of the wheel on a further vehicle with the lower or under side of the track.

In the drawings like characters of reference indicate corresponding parts in the different figures.

DETAILED DESCRIPTION

Figure 4:
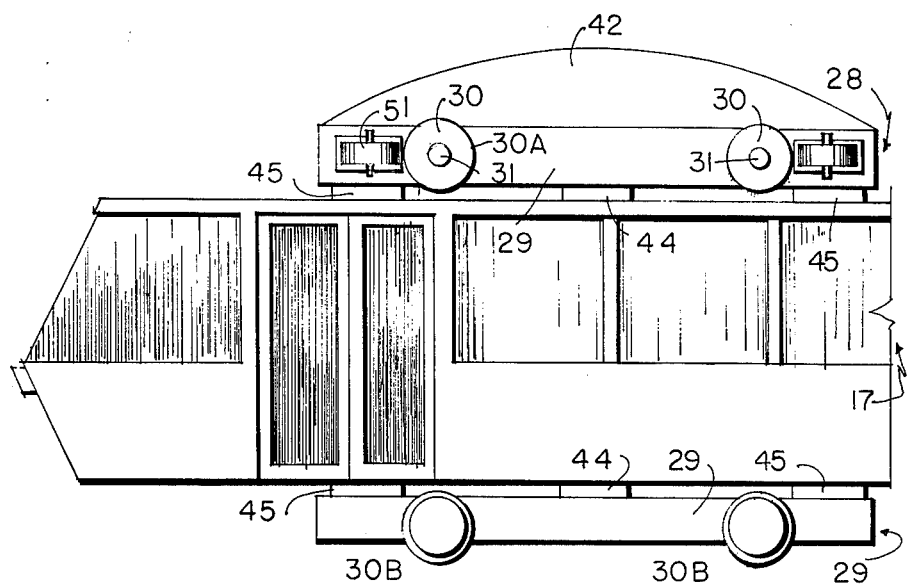
FIG. 4 is an enlarged side elevation of one end of one of the vehicles.
Figure 5:
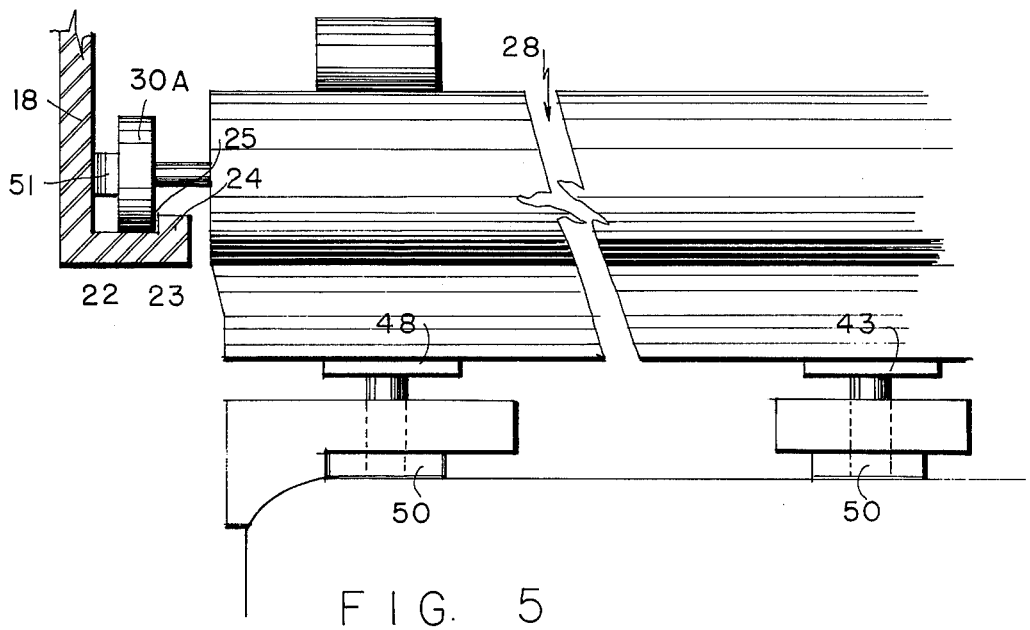
FIG. 5 is an enlarged fragmentary cross sectional view showing one of the wheeled bogeys upon the vehicle engaging the underside of the track.

Proceeding therefore to describe the invention in detail, reference character 10 shows generally support columns which are spacially disposed from one another and anchored to a supporting medium 11, there being pairs of columns in the embodiment shown in FIG. 1 in spaced apart relationship one from the other.

These columns are preferably made from reinforced concrete and may be braced by diagonals 12 if desired.

An open frame collectively designated 13 is secured to the upper ends of the pairs of columns 10 and may be built from steel or, alternatively, may be cast integrally from reinforced concrete, with the pairs of columns 10.

Figure 8:
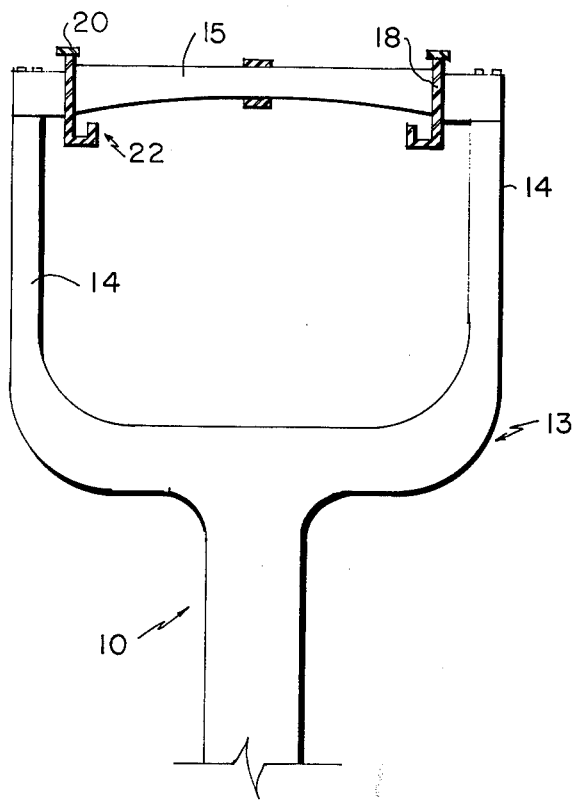
FIG. 8 is an end elevation of an alternative pylon construction.

FIG. 8 shows one desired arrangement of a precast column and frame assembly in which single column 10A is provided with the open frame 13 secured upon the upper end thereof.

The open frames 13 include the side members 14 and upper cross members 15 and here again the upper cross members 15 may either be cast integrally with the side members 12 or may be formed separately from steel or reinforced concrete and then secured between the upper ends of the side members 14.

A pair of spaced and parallel combination rail assemblies collectively designated 16 extend between adjacent columns 10 spaced above the support medium 11 so that a substantially horizontal track is provided for vehicles collectively designated 17 and 17A.

Figure 9:
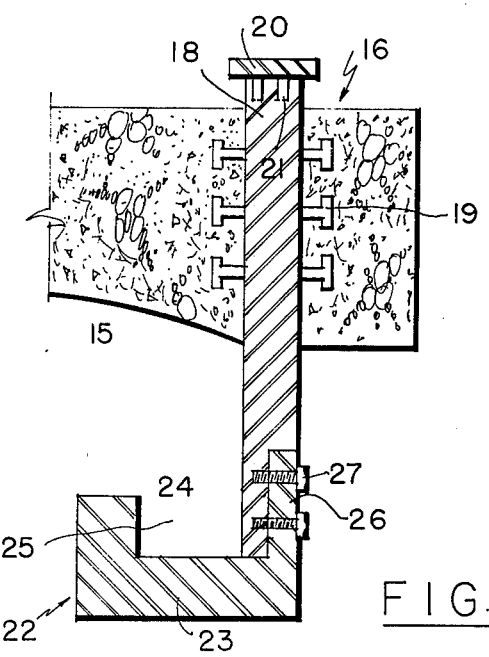
FIG. 9 is an enlarged fragmentary cross sectional view showing one method of attaching the rails to the pylon.

FIG. 9 shows one method of building the combination tracks 16. Longitudinally extending members 18 extend between adjacent pylons and may be embedded within the cross members 15 thereof, lugs 19 facilitating the anchoring of the members 18 within the concrete.

A longitudinally extending upper vehicle engaging surface or rail 20 which is planar, is secured to the upper side of the member 18 by means of bolts 21.

The member 18 forms the major leg of the lower vehicle engaging surface collectively designated 22 which includes a planar portion 23 which extends inwardly from each of the portions 18 of the two rails and then extends upwardly as at 24 which constitutes a minor vertically situated leg portion thus forming a longitudinally extending U-shaped channel 25 between the minor leg portion 24 and the major leg portion defined by member 18. The lower vehicle engaging surface 22 is provided with an upwardly extending portion 26 which may be bolted to the portion 18 by means of bolts 27 as clearly shown. Alternatively, of course, the entire rail may be made in one piece in the configuration shown in cross section in FIG. 9.

The vehicles collectively designated 17 and 17A are similar in construction to one another and are merely defined by two different numbers to differentiate between the vehicles shown in FIG. 1 running upon the underside of the rails 16 from the vehicles 17A in FIG. 1 running upon the upperside of the rails 16.

The vehicles which may be either passenger, mail or merchandise carriers or a combination thereof are of a configuration to pass with the necessary clearance, through the open frames 13 of the spaced apart pylons or vertical supports 10 and in this embodiment, the vehicles are provided with front and rear upper wheeled bogeys collectively designated 28 and front and rear lower wheeled bogeys collectively designated 29.

However, it will be appreciated that single wheeled bogeys may be provided on very short vehicles and that the bogeys may be provided with one or more pairs of wheels.

In this embodiment, two pairs of wheels are provided for each of the upper wheeled bogeys 28.

The upper wheeled bogeys 28 include a substantially rectangular frame 29 having pairs of wheel assemblies 30 journalled for rotation transversely of the frame upon axles or spindles 31.

Either or both of these wheeled assemblies may be power driven and in this respect, FIG. 3 shows schematically a source of power 32 which may take the form of an electric motor, having a drive axle 33 extending upon each side thereof with gears 34 secured thereto. These gears engage further gears 35 mounted upon a secondary shaft 36 which in turn is mounted within bearings 37.

A gear 38 on this secondary shaft 36 engages a drive gear 39 mounted upon wheel axle 31 and supplies rotation to the wheel 31 which is journalled within bearings 40 within the housing 41.

The entire bogey may be covered by a shroud or cover 42 as desired.

Figure 7:
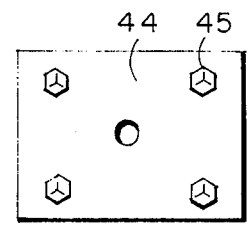
FIG. 7 is a top plan view of the central mounting plate of one of the wheeled bogeys.

The bogey is mounted upon the upper side of the vehicle by means of a central mounting pin or shaft 43 engaging within a bearing plate 44 (see FIG. 7) in turn secured to the upper side of the vehicle body by means of bolts 45.

Figure 6:
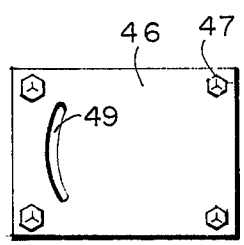
FIG. 6 is a top plan of one of the mounting plates for the wheeled bogey allowing slight rotational movement thereof.

Guide plates 47 (see FIG. 6) are secured to the upper side of the vehicle body by means of bolts 47 and guide pins 48 extend downwardly from the bogey frame into arcuate slots 49 within the guide plates and are secured to a thrust bearing 50 on the underside of these guide plates. This means that the bogey is mounted for limited rotational movement in a horizontal plane and facilitates the movement of the vehicle around curves which might be present in the rail system.

However, it will be appreciated that many forms of mounting can be provided for these upper wheeled bogeys 28.

The wheels 31, preferably rubber tired, engage within the U-shaped slots 25 constituting part of the lower vehicle wheel engaging surfaces 22 so that the vehicle is suspended within these channels by the upper wheeled bogeys 28 so that it travels upon the underside of the rail as shown in FIG. 1 and identified by reference character 17.

Small wheels 51 are journalled for rotation in a horizontal plane, within the sides of the bogey frame 29 and these engage the major leg 18 of the rails thus limiting horizontal movement of the vehicles and therefore act as horizontal-movement-stabilizing wheels.

The lower wheeled bogeys 29 are similar in configuration and construction and have therefore been given similar reference characters.

The principal difference lies in the fact that the thrust bearings 50 are upon the upper sides of the plates 44 and 46, but these are not illustrated as it is believed conventional in engineering practice to provide such thrust bearings where desired.

The wheels 31B of the lower wheeled bogeys are flanged rather than the non-flanged wheels 31A of the upper bogeys as shown in phantom in FIG. 2. The flanged portions 52 are on the inner sides of the main wheels 53 which are relatively wide and which may also be covered with rubber or the equivalent for quiet running.

These flanged wheels engage the upper vehicle engaging surfaces or rails 20 so that the vehicle runs on the upper side of the rails as indicated by reference character 17A in FIG. 1.

This means that any number of vehicles can move in one direction upon the underside of the rails, engaging same by the upper wheeled bogey assemblies and any number of vehicles can run in the opposite direction upon the upper side of the rails engaging the upper sides by the lower wheeled bogeys.

At the end of the line or at any convenient location, the vehicles can be moved from the under side to the upper side or vice-versa by means of simple elevator construction which does not form part of the present invention.

While the present specification and drawings describes and illustrates self-propelled vehicles, nevertheless it will be appreciated that prime mover units can be provided which may pull or push non-energized vehicles.

Furthermore, although the longitudinally extending major leg portion 18 of the rails is shown as being a continuous length, nevertheless it will be appreciated that relatively short lengths of this portion may be embedded within the cross members 15 of the individual vertical supports with other lengths being bolted thereto after assembly in order to facilitate the erection of the structure.

However, such construction is believed to be obvious and therefore has not been illustrated in the accompanying drawings.

FIG. 3 shows a slightly different construction of the rails in which the rail is formed in one piece and is attached to hangers 54 secured to and extending from the individual pylons or supports. In this instance, the rail section is secured to the hangers 54 by means of bolts 55 and the upper rail or vehicle engaging surface 20 is bolted to a horizontal flange 56 so that it can readily be replaced if wear occurs.

Since various modification can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A transit system comprising in combination a plurality of support columns spacially disposed from one another and anchored to a support medium, a pair of spaced and parallel rail assemblies spanning said support columns above said supporting medium, said rail assemblies including upper and lower vehicle carrying surfaces, and at least one transit vehicle, said vehicle having at least one wheeled bogey on the upper side thereof and at least one wheeled bogey on the under side thereof, said wheeled bogey on the under side thereof engaging said upper vehicle engaging surface of said rail when said vehicle is running on said upper vehicle engaging surfaces, said wheeled bogey on the upper side thereof engaging said lower vehicle engaging surface when said vehicle is running on said lower wheel engaging surfaces, said rail assembly including said upper vehicle surface being substantially planar, and flanged wheels on said wheeled bogey on the under side of said vehicle, said rail assembly including said lower vehicle engaging surface having a major vertical leg portion, a planar portion extending by one side thereof from the lower end of said major leg portion and a minor leg portion extending upwardly from the other side of said planar portion in spaced and parallel relationship to said major leg portion.

2. The system according to claim 1 in which said wheeled bogey on the upper side of said vehicle includes a frame mounted upon said vehicle for limited rotation in a horizontal plane, at least one pair of wheels journalled for rotation in a vertical plane, to said frame, and engaging said lower wheel engaging surfaces of said rails when said vehicle is running on said lower wheel engaging surfaces, and at least one horizontal-movement-stabilizing wheel journalled for rotation in said frame in a horizontal plane and engageable with said rail assembly.

3. In a transit system which includes a plurality of support columns spacially disposed fron one another and anchored to a supporting medium; a pair of spaced and parallel rail assemblies spanning said support columns above said supporting medium, said rail assemblies including upper and lower vehicle carrying surfaces, and at least one transit vehicle, said vehicle having at least one wheeled bogey on the upper side thereof and at least one wheeled bogey on the under side thereof, said wheeled bogey on the under side thereof engaging said upper vehicle engaging surface of said rail when said vehicle is running on said upper vehicle engaging surfaces, said wheeled bogey on the upper side thereof engaging said lower vehicle engaging surface when said vehicle is running on said lower wheel engaging surfaces, said rail assembly including said upper vehicle surface being substantially planar, and flanged wheels on said wheeled bogey on the under side of said vehicle, said rail assembly including said lower vehicle engaging surface having a major vertical leg portion, a planar portion extending by one side thereof from the lower end of said major leg portion and a minor leg portion extending upwardly from the other side of said planar portion in spaced and parallel relationship to said major leg portion.

4. A system according to claim 3 in which said wheeled bogey on the upper side of said vehicle includes a frame mounted upon said vehicle for limited rotation in a horizontal plane, at least one pair of wheels journalled for rotation in a vertical plane, to said frame, and engaging said lower wheel engaging surfaces of said rails when said vehicle is running on said lower wheel engaging surfaces, and at least one horizontal-movement-stabilizing wheel journalled for rotation in said frame in a horizontal plane and engageable with said rail assembly.

5. In a transit system which includes a plurality of support columns spacially disposed from one another and anchored to a supporting medium, a pair of spaced and parallel rail assemblies spanning said support columns above said supporting medium, said rail assemblies including upper and lower vehicle engaging surfaces; a transit vehicle, said vehicle having at least one wheeled bogey on the under side thereof and at least one wheeled bogey on the upper side thereof, said wheeled bogey on the under side thereof engaging said upper vehicle engaging surface of said rails when said vehicle is running on said upper wheel engaging surfaces, said wheeled bogey on the upper side thereof engaging said lower vehicle engaging surfaces when said vehicle is running on said lower wheel engaging surfaces, said wheeled bogey on the upper side of said vehicle including a frame mounted upon said vehicle for limited rotation in a horizontal plane, at least one pair of wheels journalled for rotation in a vertical plane, to said frame, and engaging said lower wheel engaging surfaces of said rails when said vehicle is running on said lower wheel engaging surfaces, and at least one horizontal-movement-stabilizing wheel journalled for rotation in said frame in a horizontal plane and engageable with said rail assembly.

6. The system according to claim 5 in which said wheeled bogey on the upper side of said vehicle includes a frame mounted upon said vehicle for limited rotation in a horizontal plane, at least one pair of wheels journalled for rotation in a vertical plane, to said frame, and engaging said lower wheel engaging surfaces of said rails when said vehicle is running on said lower wheel engaging surfaces, and at least one horizontal-movement-stabilizing wheel journalled for rotation in said frame in a horizontal plane and engageable with said rail assembly.

7. In a transit system which includes a plurality of support columns spacically disposed from one another and anchored to a supporting medium; a pair of spaced and parallel rail assemblies spanning said support columns above said supporting medium, said rail assemblies including upper and lower vehicle carrying surfaces, said upper vehicle carrying surface being substantially planar, said lower vehicle engaging surface having a major vertical leg portion, a planar portion extending by one side thereof from the lower end of said major leg portion and a minor leg portion extending upwardly from the other side of said planar portion in spaced and parallel relationship to said major leg portion.

* * * * *